July 30, 1957 H. MÜLLER 2,801,290

CALLING SIGNAL RESPONDER ARRANGEMENTS

Filed Sept. 4, 1952

Inventor:
HEINRICH MÜLLER
BY:
Michael S. Striker
agt.

2,801,290
Patented July 30, 1957

2,801,290

CALLING SIGNAL RESPONDER ARRANGEMENTS

Heinrich Müller, Berlin-Zehlendorf, Germany, assignor to Telefunken Gesellschaft für Drahtlose Telegraphie m. b. H., Berlin, Germany, a corporation of Germany Application September 4, 1952, Serial No. 307,788
Claims priority, application Germany September 17, 1951
6 Claims. (Cl. 179—84)

This present invention relates to calling signal responder arrangements.

In many news and similar transmitting equipments operating over telephone lines, the transmission of call signals is effected by making use of impulse methods as well known in automatic telephone technique. Such impulse methods are also commonly used in wireless communication systems on medium and long-wave working, but they are not satisfactory, as at present known for wireless communication with mobile equipments operating on ultra short waves, because, in unfavourable conditions of terrain, the signals are often mutilated or are not received with the requisite uniformity. It is very desirable, in ultra short wave communication systems to be able to call a particular desired station selectively e. g. in police, fire brigade, frontier customs and fort wireless services, and also in some industrial equipments.

Hitherto in ultra short wave systems for services such as those above mentioned it has been usual not to use individual station call signals, but to transmit messages generally to all subscribers, all subscribers receiving each message, even though it be one intended for a single subscriber only. This is a practical disadvantage since it involves all subscribers keeping continuous watch for any calls on head phones or loud-speakers and being therefore diverted to a considerable extent from attention to other duties. There is therefore a real need for the provision of means for the transmission of selective call signals, preferably in the range of speech frequency, and which shall be simple, cheap and afford a high degree of working security and reliability. The present invention satisfies this need.

According to the main feature of this invention, a calling signal responder arrangement responsive to a calling signal of predetermined frequency comprises a series resonance circuit fed from the output of the receiver and adapted to present low impedance when the calling signal is received and a calling circuit is actuated by voltage set up, when said signal is received, across a branch of said circuit.

Figure 1:
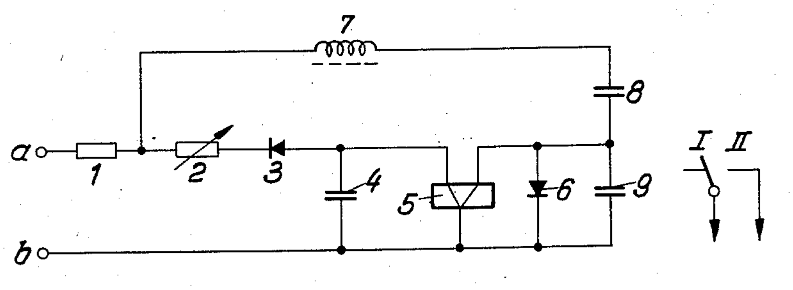
Figure 2:
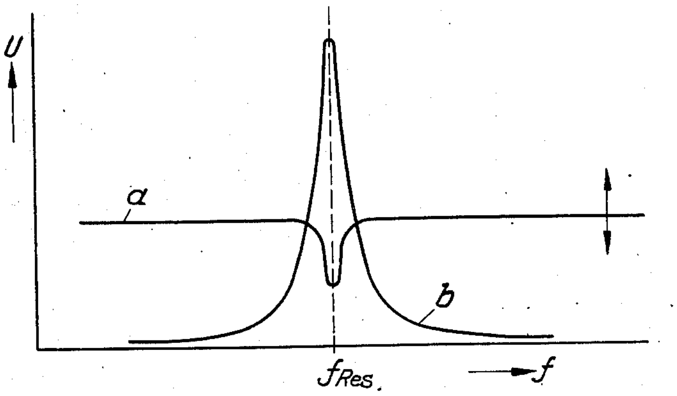

The invention is illustrated in the accompanying drawings in which Figure 1 is a diagram of one embodiment, and Figure 2 is an explanatory graphical figure.

Referring to the drawings and in particular to Figure 1, *ab*, are the terminals of the low impedance output circuit of a receiver. For example this output circuit may have an impedance of 6 ohms. Between the terminals *ab* is connected a resistance 1, an adjustable resistance 2, a rectifier 3 and one winding of a double winding relay 5 whose contacts are separately indicated at I and II and whose armature is mechanically biassed to contact I as indicated. Current through the winding mentioned aids the bias and increases the armature pressure on contact I which is the "rest" or "non-ringing" contact which is closed for ordinary signal reception. Said winding has in parallel therewith a condenser 4. A series-resonance circuit series resonant at the audio frequency which is the calling frequency for the station provided with the apparatus of Figure 1, is connected between the junction of the resistances 1, 2 and the terminal *b*. This circuit, which consists of an adjustable inductance 7 with a movable iron core for adjustment purposes and a capacity potentiometer 8, 9 is of very high impedance for all ordinary signal frequencies but of very low impedance at the predetermined ringing frequency. Across the condenser 9 is a rectifier 6 and the second winding of the relay. This second winding opposes the first and if energised sufficiently will pull the armature to contact II and thus complete a ringing or calling circuit (not shown).

Figure 2 is a graphical representation of the operation of Fig. 1 of the arrangement. In this figure, in which voltage U is plotted against frequency $f$, the curve X is the curve of rectified potential across the condenser 4. Since the circuit 1, 2, 3, 4 and the first winding of the relay is practically aperiodic the curve X would be simply a line parallel to the $f$ axis if the effect of the series resonance circuit were ignored. Curve Y is the curve of potential across the condenser 9. At the resonance frequency $f_{Res}$, the potential across the condenser 4 is reduced because of the potential drop which occurs across the resistance 1 (which is common both to the aperiodic and series resonance circuits) and simultaneously the potential across rectifier 6 reaches its maximum value. The resultant effect is to operate the relay 5 to move its armature over to contact II to actuate a lamp, a drop-indicator or an acoustic calling device. By choice of suitable values for the capacities of the condensers 8 and 9, and of a suitable value for the coil 7 (this coil may, if desired, be of the tapped type), sensitive and reliable working can be obtained. The held-on current through rectifier 3 due to ordinary signals (i. e. signals not of the ringing tone frequency) may be adjusted by adjusting resistance 2, and such adjustment also gives control of the sharpness of response to the predetermined ringing or calling frequency.

If desired a lagged or sluggish second relay with windings connected in series with the corresponding windings of the relay 5 and its ringing circuits contacts in series with those of said relay 5 may be provided so that both relays must respond before the ringing or calling circuit is completed. If this is done the calling frequency can be in the speech band for ringing will take place only in response to the predetermined ringing tone and not to momentary signals of that frequency in a message. Such an arrangement is convenient for use with wireless broadcast.

In place of using a direct acting relay 5, there can be employed any convenient current control or gate arrangement adapted, when operated, to actuate as many warning signal circuits as desired. It is possible to use as the frequency selective circuit a parallel resonance instead of a series-resonance circuit but this requires the provision in the audio part of the receiver for an additional transformer and an extra valve, and this arrangement is therefore more complex and costly than when a series-resonance circuit is used.

A calling signal responder arrangement in accordance with this invention may be used instead of the usual carrier rejectors controlled by limiter current in wireless telephone receivers. In such a case the loud-speaker which is fed from the receiver output circuit would be connected after the calling signal responder relay by means of the contacts of a relay with a self-maintaining contact.

What I claim is:

1. A frequency selective calling signal responder adapted to operate with a wireless receiver having an output signal of predetermined frequency at its output terminals, comprising, in combination, a first electrical circuit adapted to be electrically connected across the output of said receiver, said first electrical circuit being non-resonant at the predetermined frequency of the signal output of the receiver to which it is connected, said first electrical circuit having a first voltage tap at which is developed a first voltage having a first amplitude; a second electrical circuit connected in parallel with said first electrical circuit, said second electrical circuit being resonant at said predetermined frequency of said output signal of said receiver, said second electrical circuit having a second voltage tap at which is developed a second voltage having a second amplitude which changes in a direction opposite to the change in said first amplitude when a signal of said predetermined frequency is received; and means connected to said first and second voltage taps of said first and second electrical circuits for actuating a calling device.

2. A frequency selective calling signal responder adapted to operate with a wireless receiver having an output signal of predetermined frequency at its output terminals comprising, in combination, a first electrical circuit adapted to be electrically connected across the output of said receiver, said first electrical circuit being non-resonant at the predetermined frequency of the signal output of the receiver to which it is connected, said first electrical circuit having a first voltage tap at which is developed a first voltage having a first amplitude; a second electrical circuit connected in parallel with said first electrical circuit, said second electrical circuit being series resonant at said predetermined frequency of said output signal of said receiver, said second electrical circuit having a second voltage tap at which is developed a second voltage having a second amplitude which changes in a direction opposite to the change in said first amplitude which is oppositely directed to the voltage developed at said first voltage tap when a signal of said predetermined frequency is received; and a differential relay having a first and a second winding respectively connected to said first and second voltage taps of said first and second electrical circuits for a calling device.

3. A frequency selective calling signal responder adapted to operate with a wireless receiver having an output signal of predetermined frequency at its output terminals comprising, in combination, a first electrical circuit adapted to be electrically connected across the output of said receiver, said first electrical circuit being non-resonant at the predetermined frequency of the signal output of the receiver to which it is connected, said first electrical circuit having a first voltage tap at which is developed a first voltage having a first amplitude; a second electrical circuit connected in parallel with said first electrical circuit, said second electrical circuit being resonant at said predetermined frequency of said output signal of said receiver, said second electrical circuit having a second voltage tap at which is developed a second voltage having a second amplitude which changes in a direction opposite to the change in said first amplitude when a signal of said predetermined frequency is received; a first rectifier forming part of said first electrical circuit and having one of its electrodes connected to said first voltage tap; a second rectifier connected to said second voltage tap of said second electrical circuit; and a differential relay having a first and a second winding respectively connected between said first and second voltage taps of said first and second electrical circuits and one output terminal of the receiver for actuating a calling device.

4. A frequency selective calling signal responder adapted to operate with a wireless receiver having an output signal of predetermined frequency at its output terminals comprising, in combination, a first electrical circuit adapted to be electrically connected across the output terminals of said receiver, said first electrical circuit being non-resonant at the predetermined frequency of the signal output of the receiver to which it is adapted to be connected, said first electrical circuit including a first rectifier connected in series with a condenser, the junction formed by said series connected rectifier and condenser forming a first voltage tap at which is developed a first voltage having a first amplitude; a second electrical circuit connected in parallel with said first electrical circuit, said second electrical circuit being series resonant at said predetermined frequency of said output signal of said receiver, said second electrical circuit having a second voltage tap at which is developed a second voltage having a second amplitude which changes in a direction opposite to the change in said first amplitude when a signal of said predetermined frequency is received; a second rectifier connected to said second voltage tap of said second electrical circuit for rectifying the alternating current developed at said second voltage tap; and a differential relay having a first and a second winding respectively connected between said first and second voltage taps of said first and second electrical circuits and one output terminal of the receiver for actuating a calling device.

5. A frequency selective calling signal responder adapted to operate with a wireless receiver having an output signal of predetermined frequency at its output terminals comprising, in combination, means adapted to be connected to one of the output terminals of the receiver, said means producing a voltage drop when current flows therethrough; a first electrical circuit connected between said means and the other terminal of said output terminals of said receiver, said first electrical circuit being non-resonant at the predetermined frequency of the signal output of the receiver to which it is connected, said first electrical circuit having a first voltage tap at which is developed a first voltage having a first amplitude; a second electrical circuit connected in parallel with said first electrical circuit, said second electrical circuit being resonant at said predetermined frequency of said output signal of said receiver, said second electrical circuit having a second voltage tap at which is developed a second voltage having a second amplitude which changes in a direction opposite to the change in said first amplitude when a signal of said predetermined frequency is received; and means connected to said first and second voltage taps of said first and second electrical circuits for actuating a calling device.

6. A frequency selective calling signal responder adapted to operate with a wireless receiver having an output signal of predetermined frequency at its output terminals, comprising, in combination, a resistor adapted to be connected to one of the output terminals of the receiver, said resistor producing a voltage drop when current flows therethrough; a first electrical circuit connected between said means and the other terminal of said output terminals of said receiver, said first electrical circuit being non-resonant at the predetermined frequency of the signal output of the receiver, said first electrical circuit including a first rectifier connected in series with a condenser, the junction formed by said series connected rectifier and condenser forming a first voltage tape at which is developed a first voltage having a first amplitude; a second electrical circuit connected in parallel with said first electrical circuit, said second electrical circuit being resonant at said predetermined frequency of said output signal of said receiver, said second electrical circuit having a second voltage tap at which is developed a second voltage having a second amplitude which changes in a direction opposite to the change in said first amplitude when a signal of said predetermined frequency is received; a second rectifier connected to said second voltage tap of said second electrical circuit for rectifying the alternating current developed at said second voltage tap; and a differential relay having a first and a second winding respectively connected between said first and second voltage taps of said first and second eelctrical circuits and said other terminal of said output terminals of the receiver for actuating a calling device.

References Cited in the file of this patent

UNITED STATES PATENTS

| | | |
|---|---|---|
| 2,117,843 | Green | May 17, 1938 |
| 2,162,268 | Meszar | June 13, 1939 |
| 2,336,768 | Six et al. | Dec. 14, 1943 |
| 2,343,759 | Fairley et al. | Mar. 7, 1944 |
| 2,537,998 | Henguet et al. | Jan. 16, 1951 |